Jan. 9, 1968　　H. G. STEINHAGEN　　3,362,481
HYDRAULICALLY OPERATED FRICTION CLUTCH HAVING A DUMP VALVE
Filed Jan. 13, 1966
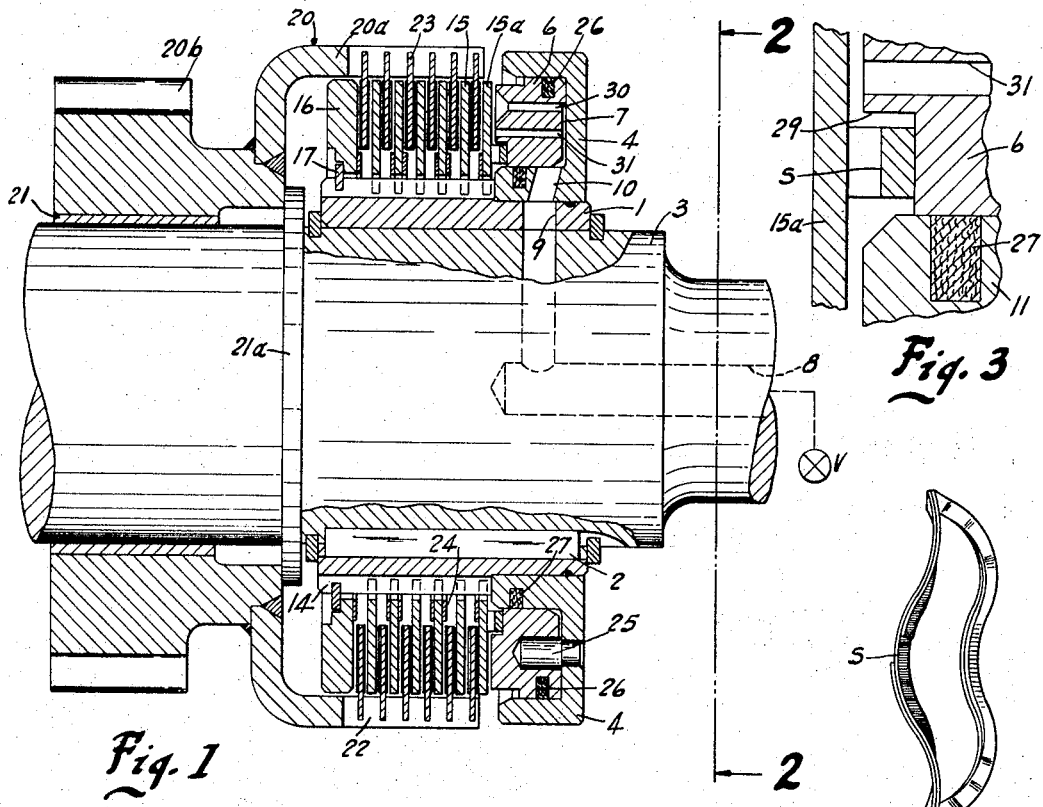
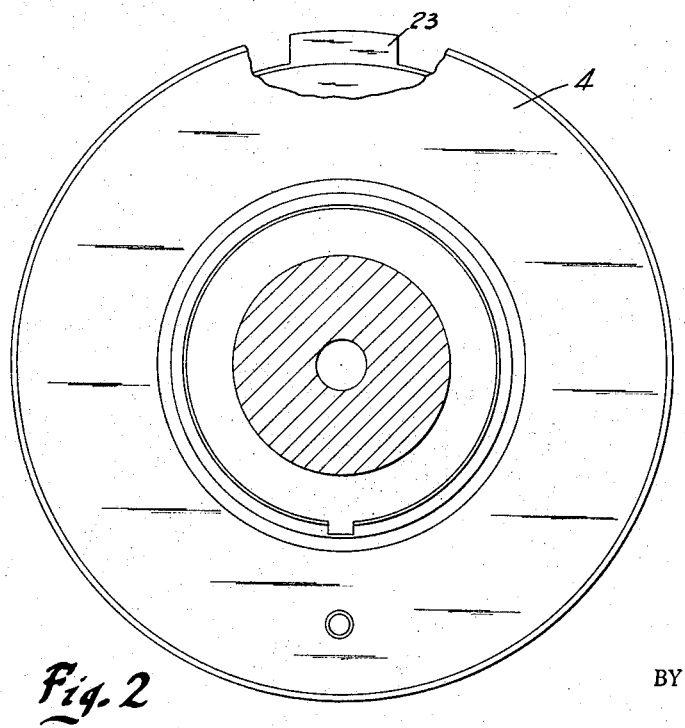
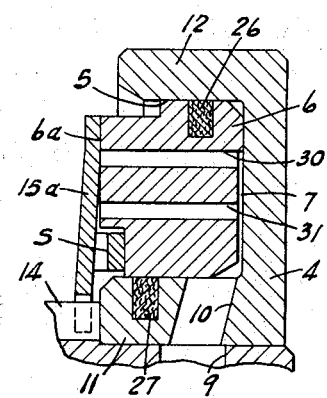
INVENTOR.
HORST G. STEINHAGEN
BY
James E. Nilles
ATTORNEY

United States Patent Office 3,362,481
Patented Jan. 9, 1968

3,362,481
HYDRAULICALLY OPERATED FRICTION CLUTCH
HAVING A DUMP VALVE
Horst G. Steinhagen, Racine, Wis., assignor to Twin
Disc, Incorporated, a corporation of Wisconsin
Filed Jan. 13, 1966, Ser. No. 520,321
5 Claims. (Cl. 192—85)

ABSTRACT OF THE DISCLOSURE

A hydraulically operated friction clutch having dump valve in the piston which clamps up the friction plates, and a wave spring carried by the piston for urging the friction plates away from the piston, and said valve including aperture means through the piston and located closely adjacent the wave spring to insure immediate dumping of fluid even though the wave spring may be bent and which would otherwise preclude immediate dumping.

---

The present invention relates generally to compact, hydraulically operated, friction clutches of the type wherein interleaved friction plates form a disengageable driving connection between two relatively rotatable members and the axial clamping force applied to the clutch plates to cause clutch engagement is applied by a hydraulically operated cylinder and piston mechanism.

Devices of this general type have heretofore been proposed and used with a certain amount of success, but one of the shortcomings of such an arrangement is the fact that clutch disengagement has been comparatively slow because of the difficulty involved in rapidly dumping the fluid from the clutch actuating chamber behind the piston. This is particularly true when such a compact clutch, of the type wherein the present invention finds particular utility, is operated at high speeds, such as for example, 6,000 r.p.m. In devices of this character, the axial thrust due to the centrifugal head of the fluid in the actuating chamber is considerable and even though the fluid pressure has been shut off to the actuating chamber, this centrifugal head continues to cause clutch lockup.

Various devices, such as shown in the U.S. Patent to McFarland No. 2,670,828, issued Mar. 2, 1954, have been proposed for quickly dumping the fluid in a clutch of the above type and the present invention is directed to an improved means for accomplishing this function.

Generally the invention provides a compact, hydraulically operated friction clutch having a piston including a dumping aperture therethrough and which together with one of the friction plates serves as a quick dumping valve; a wave spring is mounted in the piston and the aperture is located closely adjacent the wave spring.

The particular wave spring and its location relative to the aperture and inner diameter of the piston is such that it will positively separate the piston and said one valve plate notwithstanding the fact that the plate may be of improper shape. With the present invention there is no need to slow the clutch down in order to overcome the centrifugal head and dumping of the fluid and piston retraction positively occurs immediately and at high speeds and without malfunction.

The wave spring as used in accordance with the invention in a clutch of the above type insures dumping of the chamber and prevents malfunction, due to foreign matter, bent plates, or the like.

These and other objects and advantages of the present invention will appear hereinafter as this disclosure progresses, reference being had to the accompanying drawings, in which:

FIGURE 1 is a longitudinal cross sectional view through a clutch embodying the present invention;
FIGURE 2 is an end view of the clutch shown in FIGURE 1, certain parts being shown as broken away or in section for clarity;
FIGURE 3 is a fragmentary and enlarged sectional view of the portion of the device shown in FIGURE 1;
FIGURE 4 is a perspective view of a wave spring shown in FIGURE 1; and
FIGURE 5 is a view similar to FIGURE 3 but showing a bent or dished valve plate.

Referring in greater detail to the drawings, the compact clutch C provided by the present invention includes a first rotatable member in the form of a sleeve 1 which is fixed by means of the key 2 to the shaft 3. Suitable snap rings hold the sleeve fixed in an axial direction on the shaft. An annular cylinder 4 is brazed to the sleeve 1 and thereby fixed for rotation with the sleeve and the shaft. The cylinder has an annular bore 5 and the piston 6 is axially slideable in this bore so as to form an expansible fluid chamber 7 therebetween.

A fluid passage is provided from a source of fluid (not shown) to the actuating chamber and takes the form of the longitudinal passage 8 in the shaft, cross port 9 in the sleeve, and port 10 in the inner wall 11 of the cylinder 4.

It will be noted that the cylinder also includes an outer wall 12 which is generally coextensive in axial length with the inner wall 11.

The sleeve 1 has an externally splined portion 14 on which are mounted the clutch plates 15 in the conventional manner. The plates 15 can slide axially on the splines 14 within the limits determined by the backup plate 16 which is also splined to the sleeve 1. A snap ring 17 holds the backup plate 16 against unlimited movement in one direction.

A second rotatable member 20, in the form of a cup 20a welded to a driven gear 20b, is rotatably mounted in any suitable manner, such as for example, on a sleeve bearing 21 on the shaft 3, and a suitable spacer 21a is provided between gear 20b and sleeve 1. This cup has a series of slots 22 in which are mounted the discs 23 which interleave with friction discs 15 in the conventional manner. Thus when the interleaved discs or plates 15, 23 are compressed or clamped axially together, they form a driving connection between the two rotatable elements 1 and 20.

A Belleville spring 24 is interposed between each of the friction discs so as to urge them apart when the clutch is released.

It will be noted that the piston is generally coextensive in radial length with the clutch plates which contributes to a compact design.

The piston 6 has a clutch engaging surface 6a which can abut against the valve plate 15a located at one end of the stack of plates. When the clutch is engaged, as will appear, surface 6a bears tightly against the valve plate 15a.

A pin 25 is fixed in the cylinder and extends into a complementary bore in the piston so as to prevent relative rotation between the piston and cylinder and still permit axial relative movement therebetween.

Suitable sliding seals 26 and 27 are provided between the piston and cylinder.

The piston also includes aperture means which may take the form of holes 30 and 31 which extend axially through the piston. The number and spacing of these holes may be varied and they extend from the actuating chamber and through the clutch contacting surface 6a of the piston. It will be noted that one of these holes 31 is located near the inner diameter of the piston for a purpose that will appear shortly.

A wave spring S is carried by the piston by being mounted in a counterbore 29 in the inner wall 11 of the piston. The wave spring extends axially outward beyond the surface 6a of the piston. The hole 31 is located adjacent the wave spring.

*Operation*

The piston is shown in FIGURE 1 in the clutch disengaged position where it is fully retracted within the cylinder. When it is desired to actuate the clutch, the valve V is opened and fluid pressure is permitted to pass through the passage means and into the chamber 7. This causes the piston to shift to the left (as viewed in FIGURE 1) because the cross sectional size of the aperture means in the piston is small enough so that incoming pressure fluid cannot escape fast enough from the chamber to prevent pressure buildup in the chamber. As a result, the pressure in the chamber causes the piston surface 6a to bear against the adjacent friction plate 15a, which functions as a valve plate, thereby closing the aperture means. The size of passages 30 and 31 is kept small enough to allow pressure buildup while the wave spring S is not compressed, provided an adequate amount of fluid is supplied to the clutch. In this manner a fluid pressure in chamber 7 continues to urge the piston to the left, thus causing clutch clamp-up.

The hole 31 is located adjacent the inner diameter of the piston, or adjacent the wave spring to insure that the fluid is dumped from the actuating chamber when the pressure has been cut off to the actuating chamber and the wave spring is supposed to move the valve plate away from the piston to open the fluid dumping holes 30, 31 and even though the valve plate 15a is inadvertently bent or dished shape, as shown in FIGURE 5. Thus the location of hole 31 renders it effective to start the clutch release action even if the valve plate is dished, and allows spring S to further expand and open holes 30.

The other hole 30 is located farther outward, in a radial direction, that is adjacent the outer diameter of the piston, so that the chamber 7 is emptied out to that location. That is to say the radially outer position of hole 30 insures dumping of the centrifugal head of fluid out to that location.

In the clutch engaged position, the clutch can continue to run indefinitely as long as pressure is maintained in the actuating chamber.

The clutches with which the present invention finds particular utility are designed to operate at high speeds, say for example, in the neighborhood of 6,000 r.p.m. As a result, the centrifugal head built up by the fluid in chamber 7 is appreciable and supplies additional axial thrust for clutch clamp-up.

When it is desired to disengage the clutch, pressure fluid is shut off from the actuating chamber 7 by closing a valve V. This reduces the basic pressure in the chamber to zero or at least to some low value and only the rotative centrifugal head of the fluid remains in the chamber. Under these circumstances, the wave spring S is sufficiently strong to urge the piston away from the valve plate 15a notwithstanding this centrifugal head thrust. Relative movement between the piston and valve plate 15a opens the aperture means, causing outward flow of the fluid from the actuating chamber, and thereupon Belleville springs 24 can push through the valve spring S to further move the piston to its retracted position within the cylinder.

With the present invention it is unnecessary for the clutch to be slowed down to a relatively low speed in order to disengage the clutch, and instead the clutch can be disengaged immediately by prompt retraction of the piston and at high rotational speeds of the clutch. Because of the stiffness of the wave spring, the necessary speed requirements can be obtained with reasonable spring size and without the necessity of using up the plate separating capacity of the Belleville springs located between the friction plates in order to insure positive and immediate piston retraction.

Various modes of carrying out the invention are contemplated as being within the scope of the following claims particularly pointing out and distinctly claiming the subject matter which is regarded as the invention:

1. A compact and integral, hydraulically operated, friction clutch comprising, a first rotatable member, a second rotatable member, interleaved friction plates connected to said members and forming a disengageable driving connection therebetween, a cylinder mounted on one of said members, a piston slidable in said cylinder and therewith defining an expansible fluid chamber, said piston having a surface which is engageable with one of said plates when said chamber is pressurized to thereby cause clamp-up of said plates and consequent driving connection between said members, pressure fluid passage means extending through said cylinder and in communication with said chamber for introducing pressure fluid into said chamber, and a wave spring between said piston and said one of said plates and resiliently urging them apart, aperture means extending through said piston from said chamber through said surface, said aperture means located closely adjacent to said wave spring and radially spaced therefrom, whereby when pressure fluid is shut off from said chamber said spring means urges said piston away from said one of said plates to open said aperture means and permit fluid to escape from said chamber.

2. A clutch as defined in claim 1 further characterized in that said wave spring is located adjacent the inner diameter of said piston, and said aperture means includes a hole also located adjacent said inner diameter.

3. A clutch as defined in claim 2 wherein said aperture means also includes a second hole located adjacent the outer diameter of said piston.

4. A clutch as defined in claim 1 further characterized in that said first rotatable member is a sleeve and said cylinder is rigidly fixed to said sleeve for rotation therewith as a unit, and said pressure fluid passage means extends through said sleeve and cylinder.

5. A clutch as defined in claim 4 further characterized in that said sleeve has external splines for mounting some of said friction plates thereon.

References Cited

UNITED STATES PATENTS

| | | | |
|---|---|---|---|
| 2,670,828 | 3/1954 | McFarland | 192—106 X |
| 2,925,159 | 2/1960 | Black | 192—106 X |
| 3,266,608 | 8/1966 | Lemiux | 192—85 |
| 3,285,379 | 11/1966 | Helquist | 192—85 |

BENJAMIN W. WYCHE, III, *Primary Examiner.*